United States Patent
Patel et al.

(10) Patent No.: US 7,911,983 B2
(45) Date of Patent: Mar. 22, 2011

(54) SELECTIVE MUTE/UNMUTE CONTROL OVER APPLICATIONS RUNNING ON A PC

(75) Inventors: Labhesh Patel, San Francisco, CA (US); Martin R. Eppel, Santa Clara, CA (US); Mukul Jain, San Jose, CA (US); Aaron Tong, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1333 days.

(21) Appl. No.: 11/194,029

(22) Filed: Jul. 29, 2005

(65) Prior Publication Data

US 2007/0025335 A1    Feb. 1, 2007

(51) Int. Cl.
*H04L 12/16* (2006.01)

(52) U.S. Cl. .............. 370/259; 379/199; 379/201.01

(58) Field of Classification Search ........... 370/259; 379/201.01, 199
See application file for complete search history.

(56) References Cited

U.S. PATENT DOCUMENTS

| | | | |
|---|---|---|---|
| 5,729,687 A | 3/1998 | Rothrock et al. | |
| 5,987,106 A * | 11/1999 | Kitamura | 379/110.01 |
| 6,014,427 A | 1/2000 | Hanson et al. | |
| 6,236,854 B1 | 5/2001 | Bradshaw, Jr. | |
| 6,259,405 B1 | 7/2001 | Stewart et al. | |
| 6,501,739 B1 | 12/2002 | Cohen | |
| 6,545,596 B1 | 4/2003 | Moon | |
| 6,602,820 B1 | 8/2003 | Bradshaw, Jr. | |
| 6,671,262 B1 | 12/2003 | Kung et al. | |
| 6,674,451 B1 * | 1/2004 | Fado et al. | 715/764 |
| 6,816,469 B1 | 11/2004 | Kung et al. | |
| 6,865,540 B1 | 3/2005 | Faber et al. | |
| 6,876,734 B1 | 4/2005 | Summer et al. | |
| 6,931,001 B2 | 8/2005 | Deng | |
| 6,931,113 B2 | 8/2005 | Ortel | |
| 6,985,745 B2 | 1/2006 | Quaid | |
| 6,987,744 B2 | 1/2006 | Harrington et al. | |
| 7,624,259 B2 * | 11/2009 | Bear et al. | 713/1 |
| 2002/0093683 A1 * | 7/2002 | Focazio et al. | 358/1.17 |
| 2004/0162747 A1 | 8/2004 | Yeh et al. | |
| 2004/0234046 A1 | 11/2004 | Skladman et al. | |
| 2005/0135383 A1 | 6/2005 | Shenefiel | |
| 2005/0157708 A1 | 7/2005 | Chun | |
| 2005/0177622 A1 | 8/2005 | Spielman et al. | |
| 2005/0210112 A1 | 9/2005 | Clement et al. | |
| 2005/0262208 A1 | 11/2005 | Haviv et al. | |
| 2006/0193459 A1 * | 8/2006 | Cadiz et al. | 379/211.02 |

* cited by examiner

*Primary Examiner* — Quynh H Nguyen
(74) *Attorney, Agent, or Firm* — The Law Offices of Bradley J. Bereznak

(57) ABSTRACT

A computer includes a sound card and a processor that runs one or more applications that cause the processor to generate audio signals coupled to the sound card. The processor is operable to execute code that provides a graphical user interface which allows a user to selectively mute the audio signals associated with a set of the one or more applications. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

10 Claims, 3 Drawing Sheets

SELECTIVE MUTE/UNMUTE CONTROL OVER APPLICATIONS RUNNING ON A PC

FIELD OF THE INVENTION

The present invention relates generally to the fields of computer audio systems and telephony, specifically, Internet Protocol (IP) telephony involving communications through a personal computer (PC).

BACKGROUND OF THE INVENTION

Virtually all personal computers manufactured today include some kind of audio circuitry or sound card for processing and outputting (i.e., "play-out") a variety of sounds produced by different applications running on the PC. By way of example, U.S. Pat. No. 6,885,900 describes a personal computing system with audio processing circuitry providing multiple channel audio. The audio signals handled by the sound card of a typical PC range from simple alarm and reminder signals (such as those produced by programs that handle electronic mail, event calendars, signal detection at an infrared (IR) port, etc.) to voice over IP (VoIP) communications; that is, voice delivered using the Internet Protocol. In general, VoIP involves sending voice (audio) information in digital form in discrete packets over packet-switched computer networks as opposed to traditional analog communications delivered over a public switched telephone network (PSTN).

Software-based applications that deliver enhanced IP telephony support through personal computers with the functionality of an IP telephone are known in the arts. For example, Cisco® Systems' IP Communicator is an application program that can run on a PC to provide call processing and advanced telephony features such the ability to transfer calls, forward calls, hold calls, and conference additional participants to an existing call. U.S. Pat. No. 6,909,778 teaches an enhanced IP telephony system that provides a set of call-related functions traditionally provided by a private branch exchange (PBX) system for use within an enterprise.

Most personal computers include a global mute feature that allows a user to basically turn off or disable the audio output of the computer's sound card. Thus, it is common for a person to mute their PC to guard against unexpected or annoying alarm sounds as well as other sounds generated by different applications running on the computer. By way of example, when certain models of IBM® laptop computers are in close proximity to each other, an audible alarm sounds as the IR ports on the respective machines start communicating. Naturally, such an alarm sound may be undesirable or disruptive, especially during a meeting or a VoIP teleconference involving many persons. To avoid this problem, users usually disable the global mute feature of the computer. However, the drawback of globally muting the PC is that it comes at the cost of possibly missing certain important notices or events.

Additionally, there are certain circumstances in which the user might not want to mute all applications. For instance, a worker in an office cubicle may want to carry on a VoIP conversation, yet not want to hear other alarms or sounds from other applications that might disrupt her call or disturb neighboring coworkers.

What is needed is a method and apparatus for selectively muting of applications running on a PC.

By way of further background, U.S. Pat. No. 6,905,414 teaches a system for banning voice communication between someone playing a game on a PC connected over a network with one or more remote players using their own PCs to play the game. A system and method for enabling user selectable input devices for dictation or transcription in a speech application is disclosed in U.S. Pat. No. 6,342,903. U.S. Pat. No. 6,009,519 teaches a dialog-based tabbed menu system for allowing a Windows® computer user to individually set controls of the computer sound card that effect the quality of sound (e.g., volume, playback, and recording settings) of audio applications running on a Windows computer. Finally, U.S. Pat. No. 6,590,604 describes a videoconference system that includes a videoconference appliance connected to a PC through a universal serial bus (USB), which performs audio decompression/compression and call establishment/control operations in accordance with the requirements set forth in International Telecommunication Union (ITU) H.323 protocols.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Apparatus and method that permits selective mute/unmute control over applications running on a computer is described. In the following description specific details are set forth, such as device types, system configurations, product types, etc., in order to provide a thorough understanding of the present invention. However, persons having ordinary skill in the arts will appreciate that these specific details may not be needed to practice the present invention.

Figure 1:
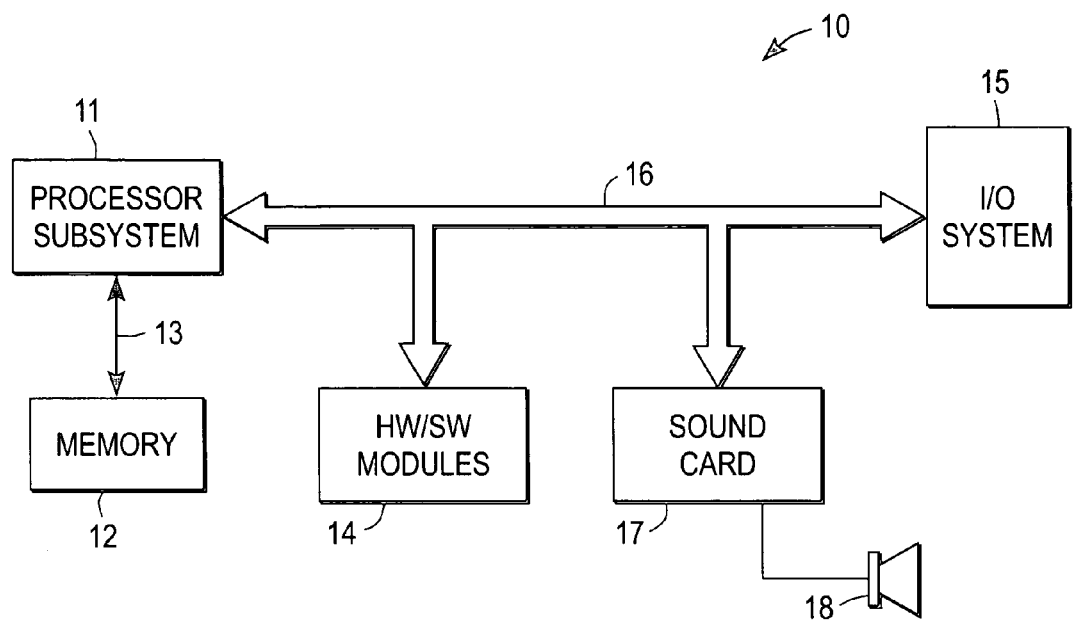
FIG. 1 is a high-level circuit schematic block diagram of a personal computing system in accordance with one embodiment of the present invention.

According to one embodiment of the present invention, a personal computer (PC) includes a new functionality in the form of a pop-up window or graphical user interface that allows a user to select which applications are to be muted, and which applications may produce audio outputs via a sound card or other audio processing circuitry of the computer system. An exemplary personal computing system 10 is shown in FIG. 1 including a processor subsystem 11 having one or more processors coupled to a memory 13 (e.g., RAM) via a memory bus 13, and to a sound card 17 across a system bus 16. Sound card 17 generates audio signals via speaker 18 for all of the sounds produced by the various applications that run on processor subsystem 11. Processor subsystem 11 is also shown coupled with an input/output (I/O) system 15 that interfaces with external devices or peripheral components connected to PC system 10. For instance, these external devices and components may include a display 21, keyboard 23 and cursor mouse 22 (see FIG. 2) as well as other network devices that communicate with PC system 10.

It is appreciated that PC system 10 may also include a variety of other devices (e.g., controllers, EEPROMs, digital signal processors, dedicated sound processor, etc.) not shown in FIG. 1. Furthermore, it should be understood that certain embodiments may comprise a multiprocessor system in which one processor manages the sound card or an audio output system, with one or more other processors running various applications. In still other embodiments, sound processing may be integrated into a processor, or multimedia chipset, that performs each of the functions described herein.

In one implementation, modules 14 comprise a software module "plug-in" that is integrated into an application program such as Cisco's IP Communicator product that delivers advanced telephony features and VoIP capabilities through a personal computer. In other implementations, the selective application mute/unmute feature of the present invention may be embodied in a software or hardware/firmware module or other computer product that includes executable code to perform the steps and processes described below.

Figure 2:
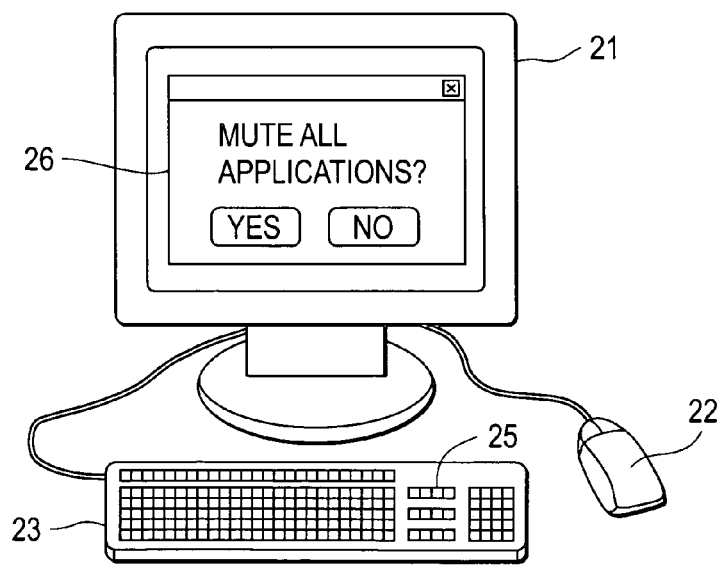
FIG. 2 illustrates a personal computer running a process for selective application mute/unmute in accordance with one embodiment of the present invention.

FIG. 2 shows one embodiment of the present invention wherein when a button 25 of keyboard 23 is pressed, a pop-up window 26 providing a graphical interface appears on the screen of display 21. The pop-up window queries the user of the PC whether or not he wants to mute all applications that play out sounds via the computer's sound card. In this example, the user may use mouse 22 to position a cursor on the display screen over either the "yes" or "no" button boxes, and click on the desired selection. Selecting the "yes" button results in all active applications being muted. In one embodiment, the same result of globally muting all applications may be achieved by double-pressing ("double-clicking") button 25. (In the context of the present application, the term "button" is used to broadly denote any feature or program that may be activated or invoked by a user through a variety of methods or mechanisms, such as by pressing, clicking, voice input commands, touch-screen/tablet entries, etc., and includes known technologies such as softbuttons, hardbuttons, etc.)

Figure 3:
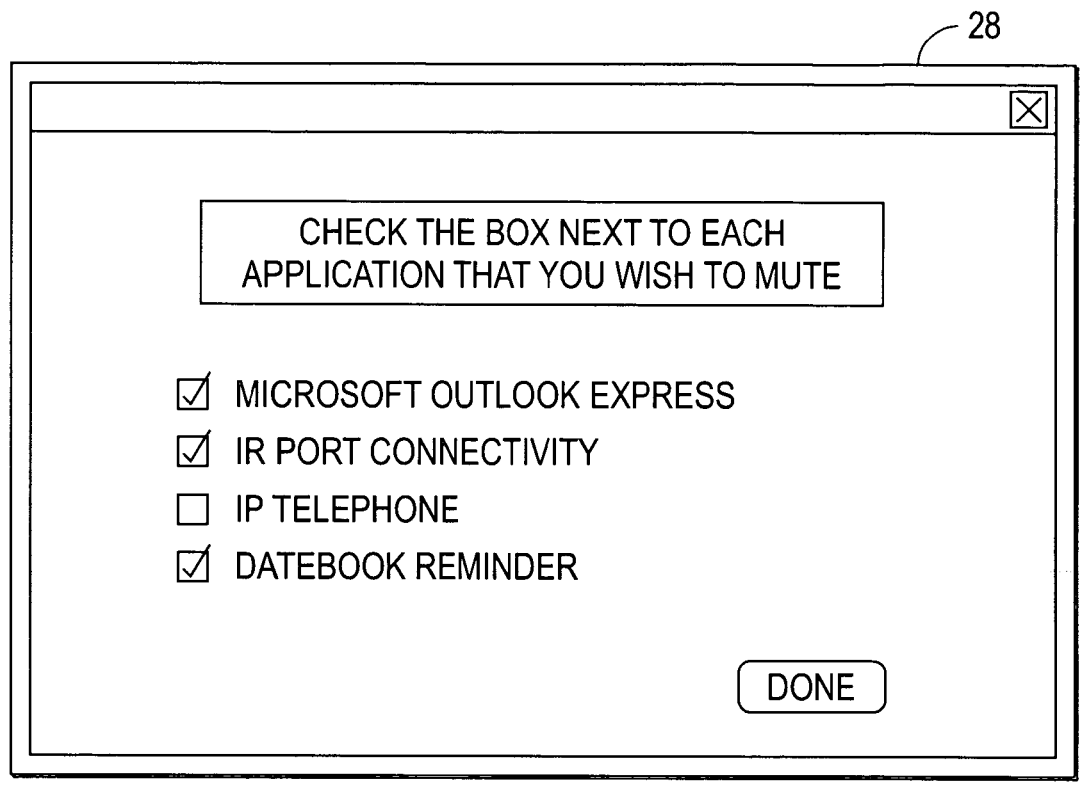
FIG. 3 illustrates a user interface window on a display screen of a PC running a process for selective application mute/unmute according to one embodiment of the present invention.

In the event that the user selects not to mute all applications (i.e., clicking the "no" button) a new pop-up window 28 appears, listing all of the active applications running on the computer (see FIG. 3). By default, all of the boxes to the left of each application listing may be unchecked, allowing the user to select (i.e., check) which applications to mute and which to leave unmuted. Alternatively, the default setting may be to have all of the boxes checked, indicating that all active applications are to be muted, in which case the user may select the particular applications he wants unmuted. In the example shown in FIG. 3, the user has chosen to mute all applications except the IP telephone function of the computer. Once the user has made his selections he may click the "Done" box to save the selection setting to memory. Clicking the "Done" box may also immediately execute these selections by enabling/disabling audio signals sent to the sound card from the processor.

In a specific embodiment, an application such as the Cisco IP Communicator application program may be included in the listings of window 28. Unchecking only the box next to the IP Communicator application (with all other boxes being checked) and saving this preference by clicking "Done", results in muting of all of the applications except the IP Communicator. This setting may be desired by a user who wants to solely enable the telephone function of his computer, i.e., hear the phone ring and be able to talk to the calling party, without explicitly unmuting the whole PC.

In yet another embodiment, an IP call management application program such as the Cisco IP Communicator program may be modified to include a software plug-in module with an Override Global Mute (OGM) setting or function. When the OGM setting is enabled and other applications running on the PC are already muted (e.g., through double-clicking keyboard button 25 or via selective checking of boxes in pop-up window 28) the phone management application overrides the original mute/unmute settings in order to utilize the sound card for playing out audio media associated with an IP phone call (e.g., ringing, voice communications, etc.). In other words, in a configuration where all or certain selected active applications are muted and the OGM setting is enabled, the IP call management application operates to dynamically unmute the sound card for its own exclusive use, say, when an incoming call is detected or an outgoing call is initiated. After the user ends the call, the IP call management application returns the system to its prior configuration, e.g., global mute, or certain selected applications muted. Upon receipt of an incoming call or upon placement of an outgoing call, and continuing throughout the entire length of the call, the sound card of the PC is dynamically reserved for exclusive use by the IP call management application program.

In still another alternative embodiment, enabling the OGM function may cause all prior or original settings to be overridden such that all sounds are muted (not just certain selected applications) except those needed for play out of media associated with an incoming and/or outgoing IP phone call. Practitioners in the art will appreciate that this prevents alarms and other sounds from being played out during a call, which feature is especially useful when attending teleconferences over the IP communicator application. Thus, in one aspect the present invention provides device level access and control over the sound card of the PC.

Figure 4:
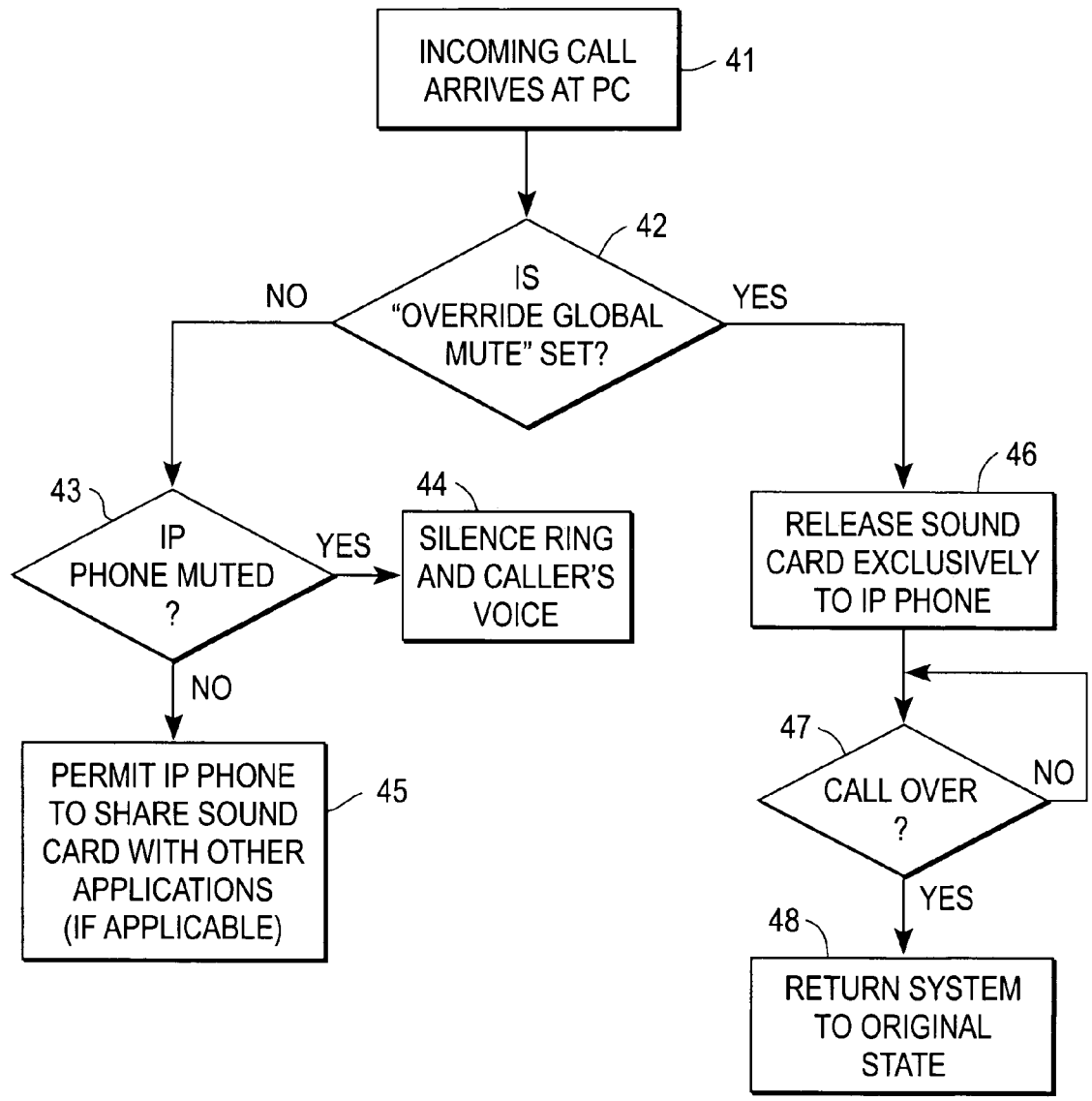
FIG. 4 is a flow chart diagram showing a method of operation in accordance with one embodiment of the present invention.

FIG. 4 is a flowchart diagram that illustrates a method of operation according to one of the above-described embodiments of the present invention which employs the OGM function. The example of FIG. 4 begins with the arrival of an incoming call at the user's PC (block 41). Upon detection of the call, the program first determines the configured state of the system, i.e., whether the OGM setting is enabled or not (block 42). If the OGM setting is disabled, the next inquiry is whether the IP phone itself has been muted (block 43). For instance, the user may have configured the system to specifically mute the IP telephone function of his PC so as to silence the ringing sound and not play out the caller's voice (block 44). Alternatively, the user may have selected certain applications to be muted, and other applications (including the IP phone) to be unmuted. In this latter configuration setting, the IP phone may share the sound card for play out of media with other selected applications (block 45).

In the case where the OGM setting is enabled, the sound card may be dynamically released for exclusive use by the IP phone or IP call management application (block 45). The sound card remains in exclusive use by the phone or call management application for the entire duration of the call (block 47), at which time the computer system is reset to the previous mute setting that was in place before arrival of the call (block 48).

It is appreciated that the example operation shown in the flow diagram of FIG. 4 is also applicable to outgoing calls initiated by the user.

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer comprising:
   audio circuitry; and
   a processor that runs one or more applications that cause the processor to generate audio signals coupled to the audio circuitry, the processor being further operable to execute code that provides a graphical user interface which allows a user to selectively mute the audio signals associated with a set of the one or more applications on an application-by-application basis comprising a first mute setting, the user also being allowed to enable a second setting, wherein when the second setting is enabled, the first mute setting is dynamically overridden responsive to an incoming call being detected or an outgoing call being placed, such that the processor only generates the audio signals coupled to the audio circuitry for playing out audio media associated with the incoming call or the outgoing call, the second setting thereby providing greater granular control over the audio circuitry.

2. The computer of claim 1 wherein the audio circuitry comprises a sound card.

3. The computer of claim 1 wherein the one or more applications include an application that provides an Internet Protocol (IP) telephone function.

4. The computer of claim 1 wherein the one or more applications include an Internet Protocol (IP) call management application.

5. The computer of claim 1 further comprising a button, activation of the button invoking the graphical user interface.

6. A processor-implemented method for controlling audio output of a personal computer (PC) comprising:
   providing a graphical user interface that allows a user to selectively mute audio outputs associated with one or more applications running on the PC on an application-by-application basis comprising a mute setting, the graphical user interface also allowing the user to enable a second setting;
   saving the mute setting and the second setting;
   disabling audio signals sent to a sound card of the PC based on the mute setting;
   dynamically overriding the mute setting in response to an Internet Protocol (IP) telephone call when the second setting is enabled, the second setting thereby providing greater granular control over the audio output of the PC.

7. The processor-implemented method of claim 6 wherein dynamically overriding the mute setting comprises:
   automatically muting all of the one or more applications, except any application associated with management or communication of the IP telephone call;
   resetting the PC to the mute setting upon completion of the IP telephone call.

8. A non-transitory tangible computer-readable storage medium encoded with a computer program, when executed, operable to:
   provide a graphical user interface that allows a user to selectively mute audio outputs associated with one or more applications running on a computer on an application-by-application basis by clicking one or more boxes corresponding to the one or more applications, a set of one or more selected icons comprising a mute setting, the graphical user interface also allowing the user to enable a second setting;
   save the mute setting and the second setting to a memory;
   disable audio signals sent to a sound card of the computer based on the mute setting;
   dynamically override the mute setting in response to an Internet Protocol (IP) telephone call when the second setting is enabled, the second setting thereby providing greater granular control over the sound card of the computer.

9. The non-transitory tangible computer-readable storage medium of claim 8 wherein the computer program, when executed, is further operable to:
   automatically mute all of the one or more applications, except any application associated with management or communication of the IP telephone call; and
   reset the PC to the mute setting upon completion of the IP telephone call.

10. A processor-implemented method for controlling audio output of a personal computer (PC) comprising:
   saving a first user setting that identifies, on an application-by-application basis, a selected set of applications running on the PC, the selected set being a subset of all applications running the PC;
   saving a second user setting that enables a mute override function, the second user setting providing greater granular control over the audio output of the PC;
   muting audio media associated with the selected set of applications running on the PC;
   dynamically overriding the first user setting in response to an Internet Protocol (IP) telephone call;
   automatically muting all active applications on the PC except any application associated with management or communication of the IP telephone call;
   resetting the PC to the first user setting upon completion of the IP telephone call.

* * * * *